US011434151B2

(12) United States Patent
Li et al.

(10) Patent No.: US 11,434,151 B2
(45) Date of Patent: Sep. 6, 2022

(54) METHODS OF IMPROVING COMPATIBILITY OF OILFIELD PRODUCED WATER FROM DIFFERENT SOURCES

(71) Applicant: Multi-Chem Group, LLC, Houston, TX (US)

(72) Inventors: Chunli Li, The Woodlands, TX (US); Leiming Li, Sugar Land, TX (US); Johnathan Scott Hazlewood, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 394 days.

(21) Appl. No.: 16/846,734

(22) Filed: Apr. 13, 2020

(65) Prior Publication Data

US 2021/0317015 A1  Oct. 14, 2021

(51) Int. Cl.
| | |
|---|---|
| *C02F 1/52* | (2006.01) |
| *B03D 3/06* | (2006.01) |
| *C02F 1/56* | (2006.01) |
| *C02F 1/68* | (2006.01) |
| *C02F 1/72* | (2006.01) |

(Continued)

(52) U.S. Cl.
CPC ............ *C02F 1/5236* (2013.01); *B03D 3/06* (2013.01); *C02F 1/56* (2013.01); *C02F 1/68* (2013.01); *C02F 1/72* (2013.01); *C02F 5/08* (2013.01); *E21B 21/068* (2013.01); *B01D 21/01* (2013.01); *C02F 1/40* (2013.01); *C02F 2101/203* (2013.01); *C02F 2103/10* (2013.01); *E21B 43/34* (2013.01); *E21B 43/40* (2013.01)

(58) Field of Classification Search
None
See application file for complete search history.

(56) References Cited

U.S. PATENT DOCUMENTS

| | | | | |
|---|---|---|---|---|
| 4,949,790 A | * | 8/1990 | Dill | .......................... C09K 8/532 |
| | | | | 507/927 |
| 2009/0200025 A1 | * | 8/2009 | Bravo | ............... H01J 37/32935 |
| | | | | 166/265 |

(Continued)

FOREIGN PATENT DOCUMENTS

WO   2016089408 A1   6/2016

OTHER PUBLICATIONS

Foreign Communication from Related Application—International Search Report and Written Opinion of the International Searching Authority, International Application No. PCT/US2020/028245, dated Jan. 12, 2021, 10 pages.

(Continued)

*Primary Examiner* — Clare M Perrin
(74) *Attorney, Agent, or Firm* — Conley Rose, P.C.; Rodney B. Carroll (57) ABSTRACT a method of treating aqueous wellbore fluids, comprising (a) converting one or more multivalent cations in a multivalent cation-containing aqueous fluid to form a mixture comprising one or more insoluble compounds and a treated aqueous fluid, (b) separating the treated aqueous fluid from the one or more insoluble compounds, and (c) contacting the treated aqueous fluid with a sulfide-containing aqueous fluid to form a compatibilized aqueous fluid, wherein the multivalent cation-containing aqueous fluid, the sulfide-containing aqueous fluid, or both were recovered from wellbores prior to (c).

20 Claims, 4 Drawing Sheets

(51) Int. Cl.
*C02F 5/08* (2006.01)
*E21B 21/06* (2006.01)
*B01D 21/01* (2006.01)
*C02F 101/20* (2006.01)
*C02F 103/10* (2006.01)
*E21B 43/34* (2006.01)
*E21B 43/40* (2006.01)
*C02F 1/40* (2006.01)

(56) References Cited

U.S. PATENT DOCUMENTS

2009/0255678 A1* 10/2009 Rosine ............... C02F 9/00
166/305.1
2014/0374104 A1* 12/2014 Seth ............... C02F 1/725
166/305.1
2016/0032176 A1* 2/2016 Jiang ............... C09K 8/725
507/229

OTHER PUBLICATIONS

Arthur, J. Daniel et al., "Technical Summary of Oil & Gas Produced Water Treatment Technologies," ALL Consulting, LLC, 2005, 53 pages.
Mousa, Khalid M. et al., "Oilfield Produced Water Treatment by Coagulation/Flocculation Processes," The Second Conference of Post Graduate Researches, 2017, pp. 75-79.
Nasiri, Masoud et al., "Produced Water from Oil-Gas Plants: A Short Review on Challenges and Opportunities," Periodica Polytechnica Chemical Engineering, 2017, pp. 73-81, vol. 61, No. 2.

* cited by examiner

METHODS OF IMPROVING COMPATIBILITY OF OILFIELD PRODUCED WATER FROM DIFFERENT SOURCES

CROSS-REFERENCE TO RELATED APPLICATIONS

Not applicable.

TECHNICAL FIELD

The present disclosure relates generally to methods of treating an aqueous fluid. More particularly, the present disclosure relates to methods of treating an aqueous wellbore fluid to form a compatibilized aqueous fluid.

BACKGROUND

Natural resources such as gas, oil, and water residing in a subterranean formation or zone are usually recovered by drilling a wellbore down to the subterranean formation. At different well sites different types of produced water can be generated. For example, one type of produced water is termed "sweet water" which is characterized by a low acidity and the presence of one or more multivalent cations. Another type of produced water is termed "sour water" which is characterized as an acidic fluid containing dissolved sulfide. When sweet and sour water are combined, one or more insoluble compounds (e.g., iron sulfide) form, which may foul the equipment, cause corrosion and interfere with wellbore operations. As these produced waters are incompatible, they are treated and disposed/injected separately, which increases the time and cost of the wellbore operation. Accordingly there exists an ongoing need for methods to process produced waters more effectively.

BRIEF SUMMARY OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more aspects are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Herein in the disclosure, "compatibility" refers to the capability that two or more aqueous fluids are compatible with each other, or the two or more aqueous fluids can exist together (e.g., contact, mix) without reacting to form undesired products (e.g., a precipitate, scale, or sludge). "Compatibilize" is to make two or more aqueous fluids compatible with each other using any methodology (e.g., treating the two or more aqueous fluids, treating one of the two or more aqueous fluids). A "compatibilized aqueous fluid" refers to an aqueous fluid made from (e.g., by mixing) two or more aqueous fluids that are compatible with each other. In an aspect, the two or more aqueous fluids can be recovered from different wellbores. An aqueous fluid recovered from a wellbore can also be referred to as an "aqueous wellbore fluid" or "produced water."

This disclosure addresses the compatibility issue of mixing aqueous fluids (e.g., produced water) from different sources, and more specifically the compatibility issue of mixing a sweet aqueous fluid with a sour aqueous fluid. Disclosed herein are methods to treat an aqueous fluid containing dissolved one or more multivalent cations to remove the one or more multivalent cations and form a treated aqueous fluid. The treated aqueous fluid can be contacted with another aqueous fluid that contains sulfide without formation of one or more insoluble compounds (e.g., iron sulfide) that are detrimental to a wellbore servicing operation (e.g., foul the equipment, cause corrosion, and interfere the oil separation and/or treating).

Disclosed herein is a method of treating aqueous fluids. The aqueous fluids can be produced from various sources. For example, an aqueous fluid can be an aqueous wellbore fluid produced from a wellbore during drilling, completion, or production. In one or more aspects of this disclosure, an aqueous fluid can include one or more multivalent cations and such a fluid is referred to hereinafter as a "multivalent cation-containing aqueous fluid." In one or more aspects, the multivalent cation-containing aqueous fluid is also referred to as "sweet water." A multivalent cation-containing aqueous fluid can be characterized by a pH of equal to or greater than about 5, alternatively from about 5 to about 14 or alternatively from about 6 to about 14.

The multivalent cation-containing aqueous fluid can include without limitation iron (II) ion ($Fe^{2+}$), iron (III) ion ($Fe^{3+}$), magnesium (II) ion ($M^{2+}$, calcium (II) ion $Ca^{2+}$), or any combination thereof. The one or more multivalent cations can be present in the multivalent cation-containing aqueous fluid in a total amount of from about 0.1 ppm to about 1,000 ppm, alternatively from about 1 ppm to about 1,000 ppm or alternatively from about 3 ppm to about 900 ppm.

In one or more aspects, an aqueous fluid can include sulfide ion. Such a fluid is referred to hereinafter as a "sulfide-containing aqueous fluid" or "sour water." In an aspect, a sulfide-containing aqueous fluid can be a sulfide-containing aqueous wellbore fluid. A sulfide-containing aqueous fluid can be characterized by a pH of less than about 7, alternatively from about 0 to about 7 or alternatively from about 0 to about 6. In one or more aspects, the sulfide-containing aqueous fluid includes hydrogen sulfide. The sulfide ion can be present in the sulfide-containing aqueous fluid in an amount of from about 0.1 ppm to about 1,000 ppm, alternatively from about 1 ppm to about 1,000 ppm or alternatively from about 3 ppm to about 900 ppm.

In an aspect, the multivalent cation-containing aqueous fluid, the sulfide-containing aqueous fluid, or both are recovered from wellbores. The wellbores can be different wellbores.

In one or more aspects, a method for treating aqueous fluid of the types disclosed herein includes contacting the multivalent cation-containing aqueous fluid with a carbonate-containing compound. In aspects, the carbonate-containing compound includes sodium carbonate ($Na_2CO_3$), potassium carbonate ($K_2CO_3$), or any combination thereof. In an aspect, the molar ratio of carbonate in the carbonate-containing compound to the one or more multivalent cations in the multivalent cation-containing aqueous fluid is from about 1:1 to about 2:1, alternatively from about 1:1 to about 1.8:1 or alternatively from about 1:1 to about 1.6:1. In an aspect, the carbonate-containing compound is $Na_2CO_3$. Without wishing to be limited by theory, contacting the multivalent cation-containing aqueous fluid with the carbonate-containing compound can result in formation of one or more insoluble carbonate salts.

In one or more aspects, the multivalent cation-containing aqueous fluid includes iron (II). In such aspects, the method of treating aqueous fluids of the types disclosed herein includes contacting the iron (II) present in the multivalent cation-containing aqueous fluid with an oxidizing agent. The oxidizing agent can include any suitable chemical that can oxidize the iron (II) ion present in the multivalent cation-containing aqueous fluid to iron (III) ion. The oxidizing agent can include air, oxygen, sodium hypochlorite, chlorine dioxide, persulfate, bromate, or any combination thereof. In such aspects, oxidation of iron (II) ion to iron (III) ion facilitates formation of other insoluble forms of iron such as ferric hydroxide ($Fe(OH)_3$). The molar ratio of the oxidizing agent to the iron (II) ion can be from about 1:6 to about 2:1, alternatively from about 1:4 to about 2:1 or alternatively from about 1:2 to about 1:1.

In one or more aspects of the method disclosed herein, a multivalent cation-containing aqueous fluid is contacted with a material (e.g., oxidizing agent, carbonate-containing compound) resulting in the formation of (i) one or more insoluble compounds and (ii) a treated aqueous fluid. The one or more insoluble compounds which may form as a result of contacting the multivalent cation-containing aqueous fluid with the carbonate-containing compound and/or an oxidizing agent include salts of the one or more multivalent cations, hydroxides of the one or more multivalent cations, or any combination thereof. In one or more aspects, the one or more insoluble compounds include ferrous carbonate ($FeCO_3$), calcium carbonate ($CaCO_3$), magnesium carbonate ($MgCO_3$), ferric hydroxide ($Fe(OH)_3$), or any combination thereof.

In one or more aspects, the method further includes contacting a mixture formed herein (e.g., the carbonate-containing compound with the multivalent cation-containing aqueous fluid or the oxidizing agent with the multivalent cation-containing aqueous fluid) with a flocculating agent.

The flocculating agent (also referred to as a clarifying agent, a flocculant or a flocking agent), is a chemical that promotes flocculation by causing colloids and other suspended particles in liquid to aggregate, forming a floc. The flocculating agent can be used to improve the sedimentation or filterability of small particles, especially fine particles which would otherwise cause the liquid to be turbid (cloudy) and which would be difficult to remove by common separating techniques gravity settling, filtration) alone. Without wishing to be limited by theory, addition of the flocculating agent to the mixture formed by contacting the multivalent cation-containing aqueous fluid with the carbonate-containing compound and/or the oxidizing agent facilitates aggregation of a precipitate and consequently removal of the precipitate from the treated aqueous fluid. In one or more aspects, the precipitate forms in the mixture within equal to or less than about 6 hours, alternatively equal to or less than about 5, 4, 3, 2, and 1 hours, or alternatively equal to or less than about 50, 40, 30, 20, and 10 minutes upon contacting the mixture with the flocculating agent. The precipitate can be separated from the treated aqueous fluid (e.g., treated sweet water) by any suitable solid-liquid separation techniques such as gravity settling, filtering, centrifuging, skimming, etc. The treated sweet water can be contacted with a sour water to yield a combined, compatibilized fluid (e.g., disposal fluid) as described herein.

The flocculating agent can include polyacrylamide, a polyacrylamide copolymer, a polyacrylamide copolymer, acrylamide copolymer, aluminum hydroxide, aluminum salts, iron salts, calcium salts, silicates, polysaccharides, polyDADMAC, or any combination thereof. In one or more aspects, the flocculating agent is a polyacrylamide copolymer. The weight ratio of the flocculating agent to the one or more multivalent cations can be from about 0.01:1 to about 100:1, alternatively from about 0.01:1 to about 80:1, alternatively from about 0.01:1 to about 50:1.

In an aspect, a method of the type disclosed herein includes recovering a wellbore The wellbore fluid can be any fluid that is produced from a wellbore, for example, crude oil, which is typically produced along with significant quantities of saline water. In one or more aspects, the wellbore fluid has an oleaginous phase (e.g., oil) and an aqueous phase (e.g., saline water). In an aspect, the volume of the oleaginous phase is equal to or greater than about 30 times of the aqueous phase, and the wellbore fluid can be an emulsion having small globules of water (the aqueous phase) surrounded by hydrocarbon (the oleaginous phase). In another aspect, the volume of the aqueous phase (e.g., saline water) is equal to or greater than about 30 times of the oleaginous phase (e.g., oil), and the wellbore fluid can be referred to as an unseparated aqueous wellbore fluid, which can be an emulsion having small globules of hydrocarbon (the oleaginous phase) surrounded by water (the aqueous phase).

In one or more aspects, the method includes separating the wellbore fluid into (i) an oleaginous fluid and (ii) a multivalent cation-containing aqueous fluid (e.g., sweet water or sweet produced water). Separation of the wellbore fluid can be carried out continuously or in batches (e.g., tank farms) by any suitable liquid-liquid separation techniques gravity settling). In one or more aspects, separating the oleaginous fluid (e.g., hydrocarbon) from the multivalent cation-containing aqueous fluid includes contacting the wellbore fluid with a demulsifier. Demulsifiers (or emulsion breakers), are a class of chemicals used to separate emulsions, for example, water in oil. In an aspect, the demulsifier breaks the emulsion of the wellbore fluid so that the small globules of water aggregate to form bigger water drops, which are large enough to gravitationally separate from the oleaginous fluid (e.g., hydrocarbon). The demulsifier can include acid catalyzed phenol-formaldehyde resins, base catalyzed phenol-formaldehyde resins, epoxy resins, polyethyleneimines, polyamines, di-epoxides, polyols, dendrimer, silicon particles, silica, alumina, or any combination thereof.

In one or more aspects, the method of the present disclosure further includes converting the multivalent cation-containing aqueous fluid to form a mixture. Converting of the multivalent cation-containing aqueous fluid can be done using any suitable methodology. In one or more aspects, the converting includes contacting the multivalent cation-containing aqueous fluid with a carbonate-containing compound of the type disclosed herein which forms a mixture including (i) one or more insoluble compounds and (ii) a treated aqueous fluid. In an aspect, the method further includes separating the components of the mixture. Separating of the mixture can be carried out using any suitable solid-liquid separation techniques. For example, the separation can be conducted using a skimmer, gravity settling, centrifuging, filtration, or any combination thereof. In one or more aspects, the separation of the mixture results in a treated aqueous fluid which can be contacted with a sulfide-containing aqueous fluid (i.e., sour water) to yield a combined, compatibilized fluid (e.g., suitable for disposal) without detrimentally impacting wellbore servicing operations (e.g., formation of precipitates that foul equipment). In an aspect, the sulfide-containing aqueous fluid is a sulfide-containing aqueous wellbore fluid recovered from a wellbore. The sulfide-containing aqueous fluid and the multivalent cation-containing aqueous fluid can be recovered from different wellbores.

Figure 2:
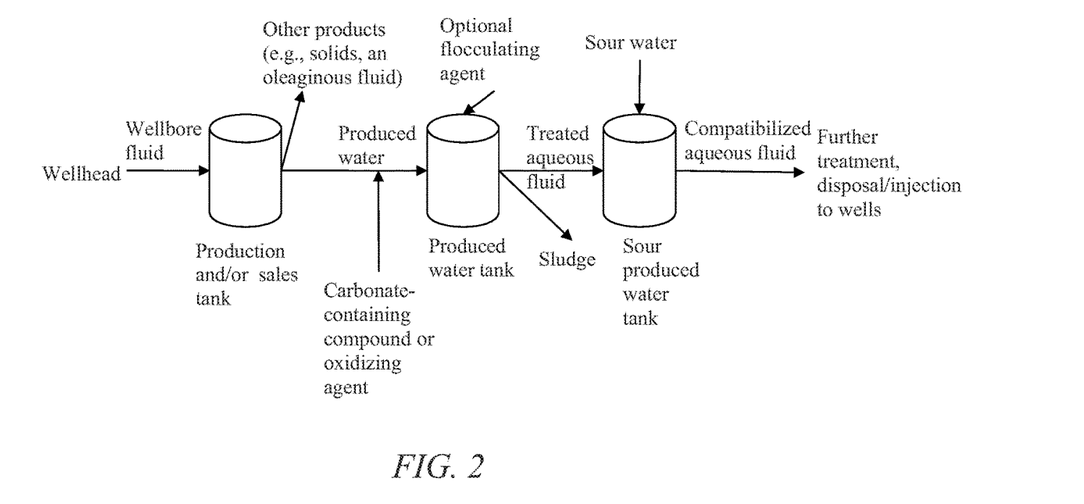
FIGS. 2 and 3 are process flow diagrams showing methods and related equipment for improving compatibility of oilfield produced water in accordance with the present disclosure.

In a scenario, referring to FIG. 2, a wellbore fluid flows from a wellhead to production and/or sales tanks. In one or more aspects a demulsifier, also of the type disclosed herein, may be placed in the production and/or sales tanks to assist in separating the wellbore fluid into products such as produced water, solids, and an oleaginous fluid (e.g., oil) in the production and/or sales tanks. The produced water may then be conveyed (e.g., pipelined or trucked) to produced water tanks (e.g., sweet produced water tanks). In one or more aspects, the produced water is sweet water which as described herein is a multivalent cation-containing aqueous fluid. In such aspects, a carbonate-containing compound of the type disclosed herein (e.g., $Na_2CO_3$ solution) may be added (e.g., injected) continuously into the flowline to the produced water tanks prior to, concurrent with, or subsequent to introduction of the produced water to the produced water tanks.

In one or more aspects, the method further includes optional addition of a flocculant polyacrylamide) which can be either added (e.g., injected) continuously or batched into the produced water tanks to form a "sludge" including the one or more insoluble compounds. A mixture of the sludge and a treated aqueous fluid of the type disclosed herein, in absence of agitation, will separate into layers based on density, with the sludge as a bottom layer and the treated aqueous fluid as an upper layer. In one or more aspects of the wellbore servicing operation, the level of the sludge in the produced water tanks can be monitored and the sludge can be trucked out when needed. The treated aqueous fluid can be conveyed (e.g., pipelined or trucked) to tanks containing sour water (e.g., sour produced water tanks) and combined with sour water to form a compatibilized aqueous fluid. The compatibilized aqueous fluid then can go for further treatment, disposal, or injection downhole.

Figure 3:
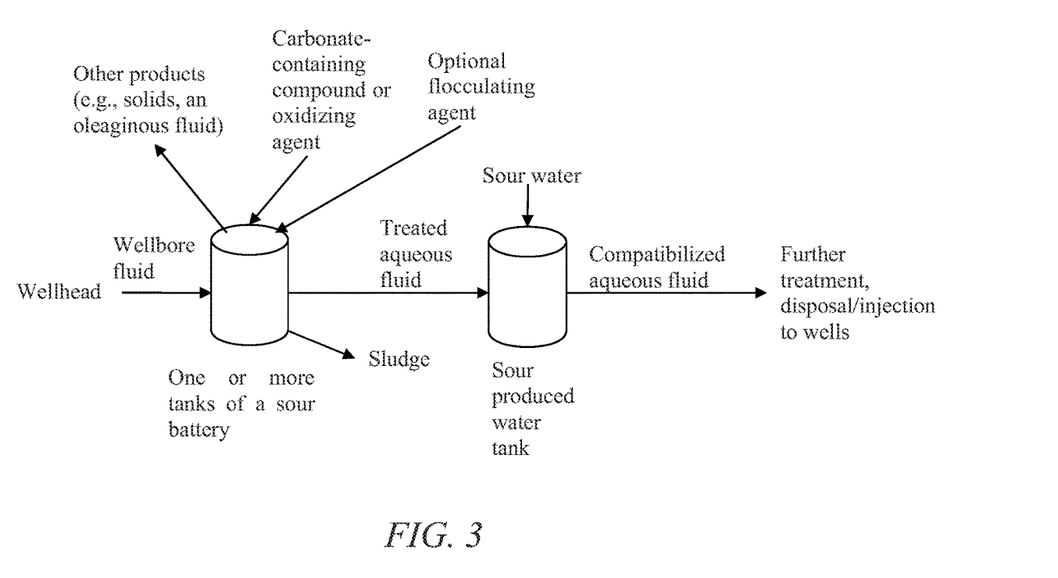

In another scenario, the method includes battery treating, and the wellbore fluid (e.g., a wellbore fluid containing produced water and hydrocarbons) can be conveyed (e.g., pipelined or trucked) out of a wellhead directly to a sour battery, which refers to a system or arrangement of tanks or other surface equipment receiving sour water produced from one or more wells, and may include equipment or devices for processing (e.g., separating) fluids such as shown in FIG. 3. Upon arrival at the sour battery, the wellbore fluid can be segregated and treated prior to being combined with sour water in one or more tanks (e.g., settling tanks) of the sour battery to produce combined, compatibilized water for disposal. The wellbore fluid can be settled in the one or more tanks prior to commingling the produced water (e.g., sweet produced water) with sour water. In one or more aspects, a demulsifier of the type disclosed herein may be placed in the one or more tanks to assist in separating the wellbore fluid into products such as produced water (e.g., sweet produced water), solids, and an oleaginous fluid (e.g., oil). The solids and the oleaginous fluid (e.g., oil) can be conveyed out of the one or more tanks. A carbonate-containing compound can be added (e.g., injected) in flowline or in the one or more tanks of the sweet produced water to form the one or more insoluble compounds. The flocculant can be added (e.g., injected) subsequent to or concurrent with the addition of the carbonate-containing compound into the one or more tanks to form a sludge containing the one or more insoluble compounds. In one or more aspects, two or more layers are formed in the one or more tanks: an upper layer including the treated aqueous fluid (e.g., treated sweet water) and a bottom layer including the sludge. The sludge can be removed from the bottom of the one or more tanks and trucked out. The treated aqueous fluid can be conveyed (e.g., trucked out, pipelined) to another area of wellbore servicing operation. For example the treated aqueous fluid (e.g., treated sweet water) may be conveyed to a sour produced water tank in the sour battery, and combined with sour water to form a compatibilized aqueous fluid. The compatibilized aqueous fluid may be processed further, such as by treatment, disposal, or injection downhole.

In one or more aspects, the produced water is a multivalent cation-containing aqueous fluid that includes iron (II). In such aspects, a mixture may be formed by contacting the produced water with an oxidizing agent. The mixture thus formed includes a treated aqueous fluid and iron (III) hydroxides which are insoluble compounds. The method can further include optionally contacting the mixture with a flocculating agent to form a sludge containing the one or more insoluble compounds, which can be subsequently separated from the treated aqueous fluid. The treated aqueous fluid can be combined with sour water to form a compatibilized aqueous fluid. The compatibilized aqueous fluid then can go for further treatment, disposal, or injection downhole.

In an aspect, the produced water is treated in an open container (e.g., an open pit) of sufficient volume. In such aspects, the produced water flows to the open container, where the ferrous ions ($Fe^{2+}$) can be oxidized into ferric ions $Fe^{3+}$) by air over a period of time, or by addition of any suitable oxidizing agents such as oxygen, sodium hypochlorite (NaClO), chlorine dioxide ($ClO_2$), persulfate, bromate, and the like. One or more insoluble compounds that may form in such aspects include ferric hydroxide ($Fe(OH)_3$). The one or more insoluble compounds can precipitate to the bottom of the open container (e.g., a pit), while the treated aqueous fluid stays on the top of the open container. Optionally, a flocculant of the type disclosed herein can be introduced to the open container to accelerate the precipitation. The treated aqueous fluid can be recovered from the open container (e.g., pit) and contacted with sour water to form a compatibilized aqueous fluid. In an aspect, the sour water is a sulfide-containing aqueous wellbore fluid recovered from a wellbore. The multivalent cation-containing aqueous fluid and the sour water can be recovered from different wellbores. The compatibilized aqueous fluid may be processed further, such as by treatment, disposal, or injection downhole.

Figure 4:
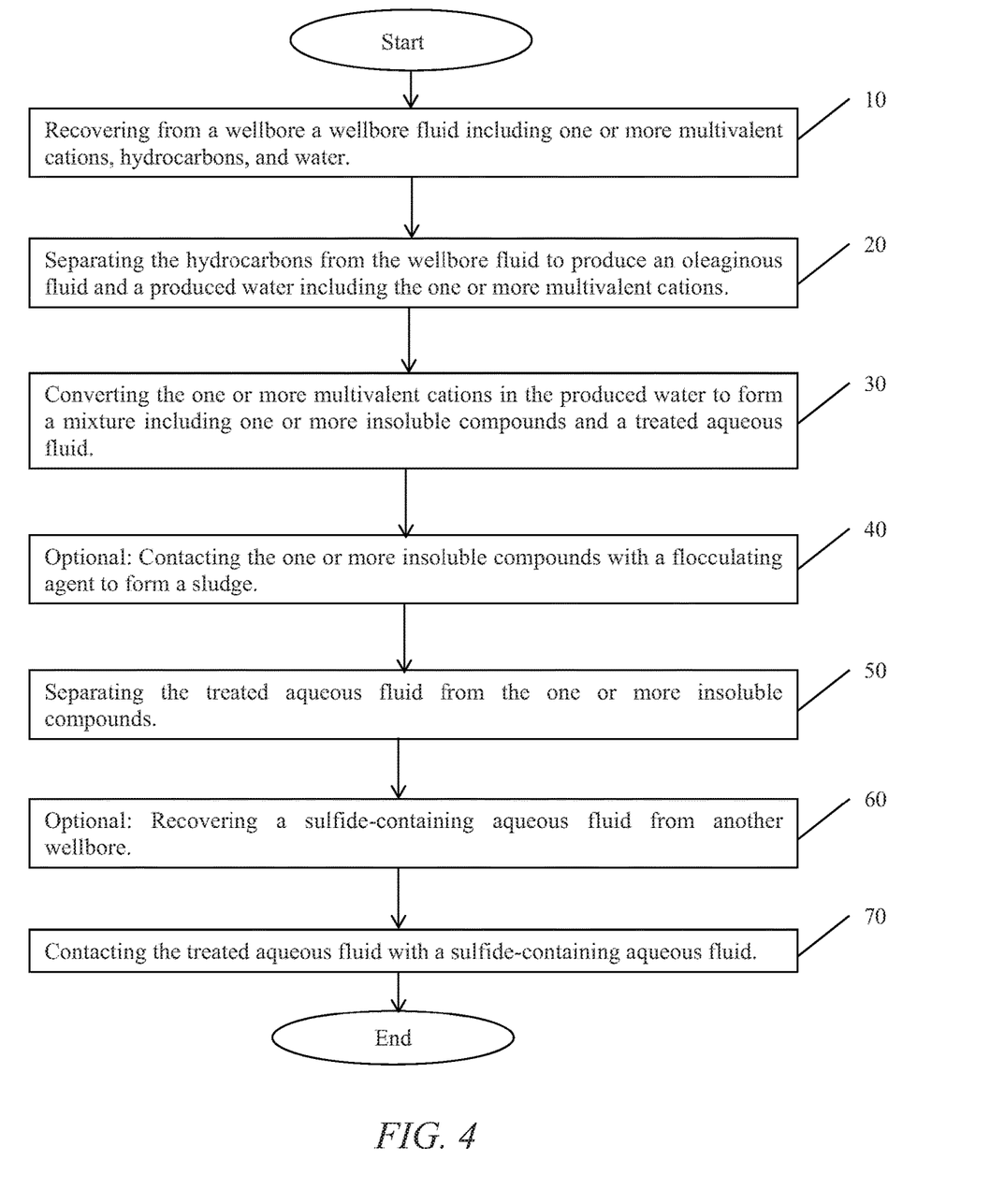
FIG. 4 is a flow chart of a method according to some aspects of the disclosure.

Referring to FIG. 4, a flow chart of a method of treating a wellbore fluid (e.g., a wellbore fluid containing produced water and hydrocarbons) in accordance with the present disclosure. Block 10 includes recovering a wellbore fluid from a wellbore. The wellbore: fluid can include one or more multivalent cations, hydrocarbons, and water. Block 20 includes separating the hydrocarbons from the wellbore fluid to produce an oleaginous fluid and a produced water. In an aspect, the produced water includes the one or more multivalent cations and is a multivalent cation-containing aqueous fluid of the type disclosed herein. In an aspect, a demulsifier contacts with the wellbore fluid to assist separating the hydrocarbons from the wellbore fluid. Block 30 includes converting the one or more multivalent cations in the produced water to form a mixture. The mixture can contain one or more insoluble compounds and a treated aqueous fluid. In an aspect, the converting can include contacting the produced water with a carbonate-containing compound. In another aspect, the one or more multivalent cations include iron (II), and the converting includes contacting the iron (II) in the produced water with an oxidizing agent. Block 40 is optional and includes contacting the one or more insoluble compounds with a flocculating agent to form a sludge. Block 50 includes separating the treated aqueous fluid from the one or more insoluble compounds. In an aspect, the one or more insoluble compounds are contained in the sludge from block 40 and the sludge is separated from the treated aqueous fluid together with the one or more insoluble compounds in block 50. Block 60 is optional and includes recovering a sulfide-containing aqueous fluid from another wellbore. Block 60 can be prior to block 70. In an aspect, block 60 is in any sequence relative to block 10, block 20, block 30, block 40, and/or block 50. Block 70 includes contacting the treated aqueous fluid with a sulfide-containing aqueous fluid. In an aspect, the sulfide-containing aqueous fluid is recovered from another wellbore as in block 60. In another aspect, the sulfide-containing aqueous fluid is from a resource different from block 60.

Various benefits may be realized by utilization of the presently disclosed methods and compositions. This disclosure addresses the compatibility issue of mixing the two types of fluids, thus can save the cost of treating, transporting, and disposing/injecting the two types of fluids separately. The presently disclosed methods and compositions are also advantageously cost effective when compared with methods utilizing large dosage of iron chelants and ferrous sulfide dissolvers.

EXAMPLES

The aspects having been generally described, the following examples are given as particular aspects of the disclosure and to demonstrate the practice and advantages thereof. It is understood that the examples are given by way of illustration and are not intended to limit the specification or the claims in any manner.

Example 1

Figure 1A:
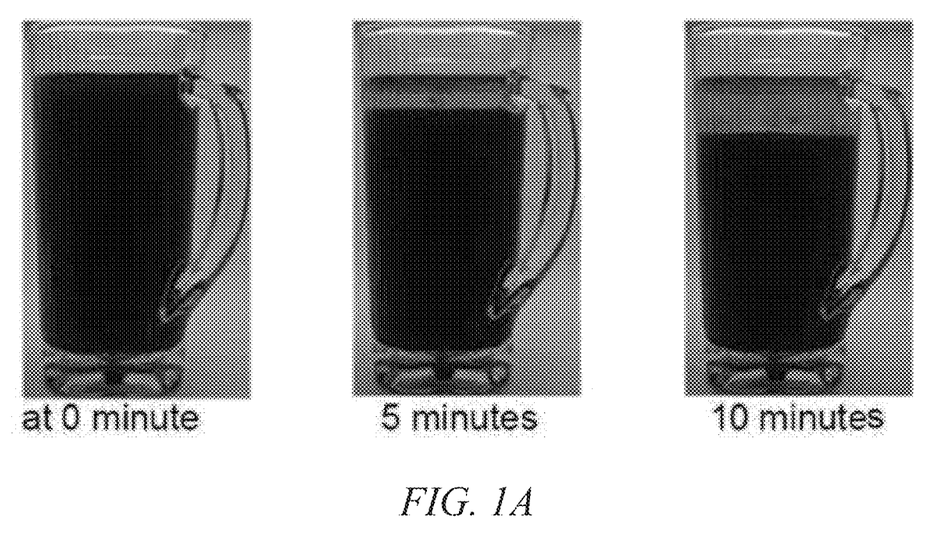
FIGS. 1A and 1B are photos of the samples from Example 1.

The presently disclosed compositions and methodology were used to compatibilize sweet water and sour water. A water sample containing 1000 ppm iron (II) ion ($Fe^{2+}$) was prepared. $Na_2CO_3$ was added to the water sample to give a molar ratio of $Na_2CO_3$ to $Fe^{2+}$ of 1:1. FIG. 1A shows that the sample formed ferrous carbonate ($FeCO_3$) at 0 minute, 5 minutes, and 10 minutes, respectively after addition of $Na_2CO_3$. As shown in FIG. 1A, the formed $FeCO_3$ particles were ultrafine and fluffy and easily went back into suspension with slight agitation.

Figure 1B:
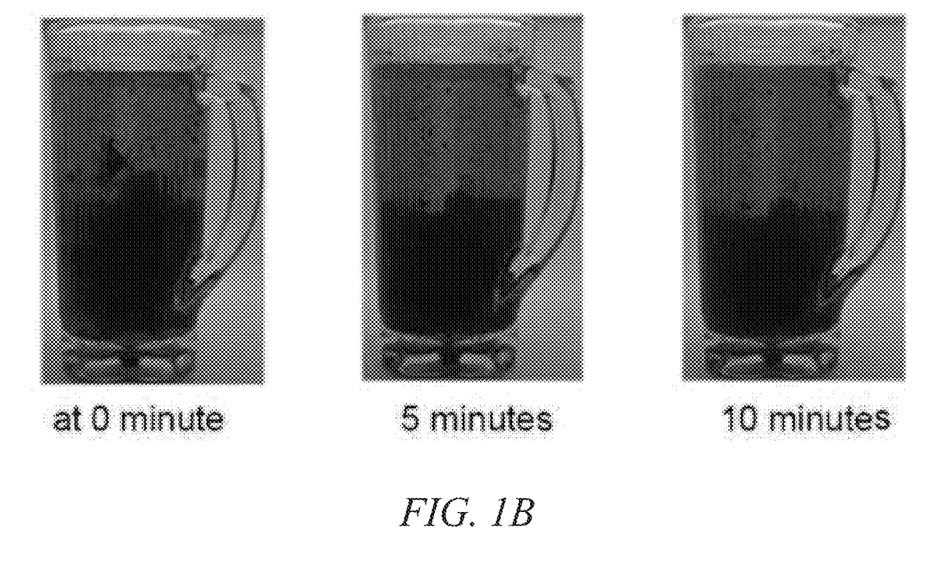

A flocculant polyacrylamide copolymer was then added to the suspension. FIG. 1B shows that $FeCO_3$ precipitated with the flocculant at 0 minute, 5 minutes, and 10 minutes, respectively after addition of the flocculant. $FeCO_3$ particles precipitated almost immediately and these particles were heavy and resisted agitation and were easily removed from the bottom of the water sample.

Additional Disclosure

The following are non-limiting, specific aspects accordance with the present disclosure:

A first embodiment, which is a method of treating aqueous wellbore fluids, comprising (a) converting one or more multivalent cations in a multivalent cation-containing aqueous fluid to form a mixture comprising one or more insoluble compounds and a treated aqueous fluid, (b) separating the treated aqueous fluid from the one or more insoluble compounds, and (c) contacting the treated aqueous fluid with a sulfide-containing aqueous fluid to form a compatibilized aqueous fluid, wherein the multivalent cation-containing aqueous fluid, the sulfide-containing aqueous fluid, or both were recovered from wellbores prior to (c).

A second embodiment, which is the method of the first embodiment, wherein the one or more multivalent cations comprise iron (II) ion, iron (III) ion, magnesium (II) ion, calcium (II) ion, or any combination thereof.

A third embodiment, which is the method of any of the first and the second embodiments, wherein the one or more multivalent cations are present the multivalent cation-containing aqueous fluid in a total amount of from about 0.1 ppm to about 1,000 ppm.

A fourth embodiment, which is the method of any of the first through the third embodiments, wherein the sulfide-containing aqueous fluid comprises hydrogen sulfide.

A fifth embodiment, which is the method of any of the first through the fourth embodiments, further comprising contacting the mixture with a flocculating agent prior to separating the one or more insoluble compounds from the treated aqueous fluid.

A sixth embodiment, which is the method of the fifth embodiment, wherein the one or more insoluble compounds precipitate in the mixture within equal to or less than about 6 hours upon contacting the mixture with the flocculating agent.

A seventh embodiment, which is the method of any of the fifth and the sixth embodiments, wherein the flocculating agent comprises polyacrylamide, a polyacrylamide copolymer, acrylamide copolymer, aluminum hydroxide, aluminum salts, iron salts, calcium salts, silicates, polysaccharides, polyDADMAC, or any combination thereof.

An eighth embodiment, which is the method of any of the fifth through the seventh embodiments, wherein the flocculating agent is a polyacrylamide copolymer.

A ninth embodiment, which is the method of any of the fifth through the eighth embodiments, wherein a weight ratio of the flocculating agent to the one or more multivalent cations is in a range of from about 0.01:1 to about 100:1.

A tenth embodiment, which is the method of any of the first through the ninth embodiments, wherein the converting comprises contacting the multivalent cation-containing aqueous fluid with a carbonate-containing compound.

An eleventh embodiment, which is the method of the tenth embodiment, wherein the carbonate-containing compound comprises sodium carbonate, potassium carbonate, or any combination thereof.

A twelfth embodiment, which is the method of the tenth and the eleventh embodiments, wherein the carbonate-containing compound is sodium carbonate.

A thirteenth embodiment, which is the method of any of the tenth through the twelfth embodiments, wherein a molar ratio of carbonate in the carbonate-containing compound to the one or more multivalent cations is in a range of from about 1:1 to about 2:1.

A fourteenth embodiment, which is the method of any of the first through the thirteenth embodiments, wherein the one or more multivalent cations comprise iron (II).

A fifteenth embodiment, which is the method of the fourteenth embodiment, wherein the converting comprises contacting the iron (II) present in the multivalent cation-containing aqueous fluid with an oxidizing agent.

A sixteenth embodiment, which is the method of the fifteenth embodiment, wherein the oxidizing agent comprises air, oxygen, sodium hypochlorite, chlorine dioxide, persulfate, bromate, or any combination thereof.

A seventeenth embodiment, which is the method of any of the fifteenth and the sixteenth embodiments, wherein a molar ratio of the oxidizing agent to the iron (II) is from about 1:6 to about 2:1.

An eighteenth embodiment, which is a method of treating a wellbore fluid, comprising (a) recovering from a wellbore a wellbore fluid comprising one or more multivalent cations, hydrocarbons, and water, (b) separating the hydrocarbons from the wellbore fluid to produce an oleaginous fluid and a produced water comprising the one or more multivalent cations, (c) converting the one or more multivalent cations in the produced water to form a mixture comprising one or more insoluble compounds and a treated aqueous fluid, (d) separating the treated aqueous fluid from the one or more insoluble compounds, and (e) contacting the treated aqueous fluid with a sulfide-containing aqueous fluid.

A nineteenth embodiment, which is the method of the eighteenth embodiment, wherein separating the hydrocarbons from the wellbore fluid comprises contacting the wellbore fluid with a demulsifier.

A twentieth embodiment, which is the method of the nineteenth embodiment, wherein the demulsifier comprises acid catalyzed phenol-formaldehyde resins, base catalyzed phenol-formaldehyde resins, epoxy resins, polyethyleneimines, polyamines, di-epoxides, polyols, dendrimer, silicon particles, silica, alumina, or any combination thereof.

A twenty-first embodiment, which is the method of any of the eighteenth through the twentieth embodiments further comprising prior to (e), recovering the sulfide-containing aqueous fluid from another wellbore.

A twenty-second embodiment, which is the method of any of the eighteenth through the twenty-first embodiments, wherein the converting comprises: contacting the produced water with a carbonate-containing compound.

A twenty-third embodiment, which is the method of any of the eighteenth through the twenty-second embodiments, wherein the one or more multivalent cations comprise iron (II), and wherein the converting comprises contacting the iron (II) in the produced water with an oxidizing agent.

A twenty-fourth embodiment, which is the method of any of the eighteenth through the twenty-third embodiments, further comprising contacting the one or more insoluble compounds with a flocculating agent to form a sludge prior to separating the treated aqueous fluid from the one or more insoluble compounds contained in the sludge.

A twenty-fifth embodiment, which is the method of any of the eighteenth through the twenty-fourth embodiments, wherein separating the treated aqueous fluid from the one or more insoluble compounds comprises using a skimmer, gravity settling, centrifuging, filtration, or any combination thereof.

A twenty-sixth embodiment, which is the method of any of the eighteenth through the twenty-fifth embodiments. Wherein the sulfide-containing aqueous fluid comprises hydrogen sulfide.

A twenty-seventh embodiment, which is a method of treating an aqueous wellbore fluid containing iron (ii) comprising contacting the aqueous wellbore fluid with sodium carbonate to form one or more insoluble compounds, contacting the one or more insoluble compounds with a flocculating agent to form a mixture of a sludge and a treated aqueous fluid, separating the treated aqueous fluid from the sludge, and contacting the treated aqueous fluid with a sulfide-containing aqueous fluid.

A twenty-eighth embodiment, which is a method of treating an aqueous wellbore fluid containing iron (II) comprising contacting the aqueous wellbore fluid with an oxidizing agent to form a mixture of one or more insoluble compounds and a treated aqueous fluid, separating the treated aqueous fluid from the one or more insoluble compounds, and contacting the treated aqueous fluid with a sulfide-containing aqueous fluid.

A thirteenth embodiment, which is the method of the twenty-eighth embodiment, further comprising contacting the mixture with a flocculating agent to form a precipitate, prior to separating the treated aqueous fluid from the one or more insoluble compounds contained in the precipitate.

A thirtieth embodiment, which is the method of any of the twenty-seventh through the twenty-ninth embodiments, wherein the sulfide-containing aqueous fluid is a sulfide-containing aqueous wellbore fluid.

While aspects have been shown and described, modifications thereof can be made by one skilled in the art without departing from the spirit and teachings of this disclosure. The aspects described herein are exemplary only, and are not intended to be limiting. Many variations and modifications of the aspects disclosed herein are possible and are within the scope of this disclosure. Where numerical ranges or limitations are expressly stated, such express ranges or limitations should be understood to include iterative ranges or limitations of like magnitude falling within the expressly stated ranges or limitations from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an aspect of the present disclosure. Thus, the claims are a further description and are an addition to the aspects of the present disclosure. The discussion of a reference herein is not an admission that it is prior art, especially any reference that may have a publication date after the priority date of this application. The disclosures of all patents, patent applications, and publications cited herein are hereby incorporated by reference, to the extent that they provide exemplary, procedural, or other details supplementary to those set forth herein.

We claim:

1. A method of treating aqueous wellbore fluids, comprising:
    (a) converting one or more multivalent cations in a multivalent cation-containing aqueous fluid to form a mixture comprising one or more insoluble compounds and a treated aqueous fluid;
    (b) separating the treated aqueous fluid from the one or more insoluble compounds; and
    (c) contacting the treated aqueous fluid with a sulfide-containing aqueous fluid to form a compatibilized aqueous fluid,
    wherein the multivalent cation-containing aqueous fluid, the sulfide-containing aqueous fluid, or both were recovered from wellbores prior to (c).

2. The method of claim 1, wherein the one or more multivalent cations comprise iron ion, iron (III) ion, magnesium (II) ion, calcium (II) ion, or any combination thereof.

3. The method of claim 1, wherein the one or more multivalent cations are present in the multivalent cation-containing aqueous fluid in a total amount of from about 0.1 ppm to about 1,000 ppm.

4. The method of claim 1, further comprising contacting the mixture with a flocculating agent prior to separating the one or more insoluble compounds from the treated aqueous fluid.

5. The method of claim 4, wherein the flocculating agent comprises polyacrylamide, a polyacrylamide copolymer, acrylamide copolymer, aluminum hydroxide, aluminum salts, iron salts, calcium salts, silicates, polysaccharides, polyDADMAC, or any combination thereof.

6. The method of claim 4, wherein a weight ratio of the flocculating agent to the one or more multivalent cations is in a range of from about 0.01:1 to about 100:1.

7. The method of claim 1, wherein the converting comprises contacting the multivalent cation-containing aqueous fluid with a carbonate-containing compound.

8. The method of claim 7, wherein the carbonate-containing compound comprises sodium carbonate, potassium carbonate, or any combination thereof.

9. The method of claim 7, wherein a molar ratio of carbonate in the carbonate-containing compound to the one or more multivalent cations is in a range of from about 1:1 to about 2:1.

10. The method of claim 1, wherein the one or more multivalent cations comprise iron (II).

11. The method of claim 10, wherein the converting comprises contacting the iron (II) present in the multivalent cation-containing aqueous fluid with an oxidizing agent.

12. The method of claim 11, wherein the oxidizing agent comprises air, oxygen, sodium hypochlorite, chlorine dioxide, persulfate, bromate, or any combination thereof.

13. The method of claim 11, wherein a molar ratio of the oxidizing agent to the iron (II) is from about 1:6 to about 2:1.

14. A method of treating a wellbore fluid, comprising:
    (a) recovering from a wellbore a wellbore fluid comprising one or more multivalent cations, hydrocarbons, and water;
    (b) separating the hydrocarbons from the wellbore fluid to produce an oleaginous fluid and a produced water comprising the one or more multivalent cations;
    (c) converting the one or more multivalent cations in the produced water to form a mixture comprising one or more insoluble compounds and a treated aqueous fluid;
    (d) separating the treated aqueous fluid from the one or more insoluble compounds; and
    (e) contacting the treated aqueous fluid with a sulfide-containing aqueous fluid.

15. The method of claim 14, wherein separating the hydrocarbons from the wellbore fluid comprises contacting the wellbore fluid with a demulsifier.

16. The method of claim 14 further comprising prior to (e), recovering the sulfide-containing aqueous fluid from another wellbore.

17. The method of claim 14, wherein the converting comprises: contacting the produced water with a carbonate-containing compound.

18. The method of claim 14, wherein the one or more multivalent cations comprise iron (II), and wherein the converting comprises contacting the iron (II) in the produced water with an oxidizing agent.

19. The method of claim 14, further comprising contacting the one or more insoluble compounds with a flocculating agent to form a sludge prior to separating the treated aqueous fluid from the one or more insoluble compounds contained in the sludge.

20. A method of treating an aqueous wellbore fluid containing iron (II) comprising:
    contacting the aqueous wellbore fluid with sodium carbonate to form one or more insoluble compounds;
    contacting the one or more insoluble compounds with a flocculating agent to form a mixture of a sludge and a treated aqueous fluid;
    separating the treated aqueous fluid from the sludge; and
    contacting the treated aqueous fluid with a sulfide-containing aqueous fluid.

* * * * *